United States Patent [19]
Horiuchi et al.

[11] Patent Number: 5,321,552
[45] Date of Patent: Jun. 14, 1994

[54] REAR-FOCUS-TYPE ZOOM LENS EQUIPPED WITH INDEX-DISTRIBUTION-TYPE LENS

[75] Inventors: Akihisa Horiuchi; Hiroyuki Hamano, both of Yokohama, Japan

[73] Assignee: Canon Kabushiki Kaisha, Tokyo, Japan

[21] Appl. No.: 899,375

[22] Filed: Jun. 16, 1992

[30] Foreign Application Priority Data

Jun. 19, 1991 [JP] Japan .................. 3-174391

[51] Int. Cl.⁵ ............................................. G02B 15/14
[52] U.S. Cl. ................................... 359/654; 359/684; 359/687
[58] Field of Search ............... 359/652-654, 359/684, 687

[56] References Cited

U.S. PATENT DOCUMENTS

| | | | |
|---|---|---|---|
| 4,776,679 | 10/1988 | Kitagishi et al. | 359/687 |
| 4,802,747 | 2/1989 | Horiuchi | 359/687 |
| 4,810,070 | 3/1989 | Suda et al. | 359/687 |
| 4,832,471 | 5/1989 | Hamano | 359/683 |
| 4,842,386 | 6/1989 | Kitagishi et al. | 359/687 |
| 4,854,684 | 8/1989 | Horiuchi | 359/687 |
| 4,892,397 | 1/1990 | Horiuchi | 359/683 |
| 4,907,866 | 3/1990 | Kitagishi et al. | 359/691 |
| 4,934,796 | 6/1990 | Sugiura et al. | 359/683 |
| 4,988,174 | 1/1991 | Horiuchi et al. | 359/683 |
| 4,998,809 | 3/1991 | Tsuji et al. | 359/557 |
| 5,009,492 | 4/1991 | Hamano | 359/684 |
| 5,011,272 | 4/1991 | Nakayama et al. | 359/692 |
| 5,050,972 | 9/1991 | Mukaiya et al. | 359/683 |
| 5,056,900 | 10/1991 | Mukaiya et al. | 359/676 |
| 5,095,387 | 3/1992 | Horiuchi | 359/676 |
| 5,134,524 | 7/1992 | Hamano et al. | 359/687 |

FOREIGN PATENT DOCUMENTS

| | | |
|---|---|---|
| 61-172110 | 8/1986 | Japan . |
| 62-247316 | 10/1987 | Japan . |
| 239011 | 2/1990 | Japan . |

*Primary Examiner*—Scott J. Sugarman
*Attorney, Agent, or Firm*—Fitzpatrick, Cella, Harper & Scinto

[57] ABSTRACT

A zoom lens having four groups and wherein at least one of the four groups is equipped with an index distribution type lens. A first lens group has a positive refracting power; a second group has a negative refracting power; a third lens group has a positive refracting power; and a fourth lens group has a positive refracting power. The first through fourth lens groups are arranged in this order from the object side, and the second group is moved to perform zooming while the fourth lens group is moved to compensate for image plane fluctuation which is incident to the zooming and also to perform focusing.

7 Claims, 10 Drawing Sheets

REAR-FOCUS-TYPE ZOOM LENS EQUIPPED WITH INDEX-DISTRIBUTION-TYPE LENS

BACKGROUND OF THE INVENTION

1. Field of the Invention

The present invention relates to a rear-focus-type zoom lens equipped with an index-distribution-type lens and, in particular, to a high-aperture-ratio, high-zoom-ratio zoom lens which has a zoom ratio of approximately 6, an f-number of approximately 1.8 and is suitable for use in a photographic camera, a video camera, a broadcasting camera or the like.

2. Description of the Related Art

Regarding the zoom lens of a photographic camera, a video camera or the like, various kinds of so-called rear-focus-type zoom lenses have been proposed up to the present time, in which focusing is effected by moving a lens group other than a first lens group which is on the object side.

Generally speaking, the effective diameter of the first lens group of a rear-focus-type zoom lens is smaller than that of a zoom lens of the type in which focusing is effected by moving the first lens group, thus reducing the size of the entire lens system. Further, the rear-focus-type zoom lens is advantageous in that it facilitates close focus shots, and in particular, ultra-close focus shots. In addition, the rear-focus-type zoom lens requires less driving power than other types of zoom lenses and therefore makes it possible to perform focusing quickly. Due to these advantages, zoom lenses of this type are being widely used as the zoom lenses for video cameras, which are required to be reduced in size and have an increase in zoom ratio.

One example of a rear focus-type zoom lens is shown in Japanese Patent Laid-Open No. 62-247316, according to which there are arranged, in order from the object side, a first lens group having a positive refracting power, a second lens group having a negative refracting power, a third lens group having a positive refracting power, and a fourth lens group having a positive refracting power. In this example, the second lens group is moved so as to effect zooming, and the fourth lens group is moved so as to compensate for an image plane fluctuation which accompanies the zooming, and also to perform focusing.

To ensure a fixed level of zoom ratio with a zoom lens having a reduced size, it is generally necessary to choose of the lens groups.

However, an increase in the refracting powers of the lens groups will cause variations in aberration, which will accompany the zooming step. To compensate for this, it is necessary to increase the number of lenses in each lens group, with the result that the thickness in the optical-axis direction of each lens group increases. Accordingly, the distance between the principal points has to be increased, resulting in an increase in the length of the entire zoom lens. In view of this, a proposal has been made in Japanese Patent Laid-Open No. 2-39011, according to which the zoom lens adopts, in addition to a spherical lens surface configuration, an aspherical lens surface configuration, thereby making it possible to ensure a fixed zooming ratio while attaining a reduction in the size of the entire lens system.

Generally speaking, by adopting the rear-focus system, it is possible to reduce the size of the entire lens system and perform focusing quickly, and facilitates close focus shots, as stated above.

In addition, by utilizing the aspherical lens surface configuration, it is possible to make the length of the entire zoom lens relatively small while maintaining a satisfactory optical performance.

However, the aspherical lens surface configuration does not provide such optical advantages as, for example, a reduction in the Petzval sum. Therefore, a lens group which is required to be achromatic must be equipped with two lenses which are different at least in dispersion characteristics so as to compensate for a chromatic aberration within the lens group. Further, it is also necessary to set the refracting power of the lens group within a range where the Petzval sum is not excessive.

Thus, even with a lens having an aspherical lens surface configuration, there has been a limit to how much the size of the entire lens system can be reduced while retaining a fixed zoom ratio.

There has also been proposed, in Japanese Patent Laid-Open No. 61-172110, a zoom lens of a so-called index distribution type, which uses a glass exhibiting a continuously changing refractive index distribution.

SUMMARY OF THE INVENTION

It is an object of the present invention to provide a rear-focus-type zoom lens which employs (either instead of or together with an aspherical lens surface configuration) an index-distribution-type lens made of a material exhibiting a continuous variation in refractive index, and which uses the rear-focus system. In this fashion, there is attained a reduction in size of the entire lens system and it is possible to easily obtain a high zoom ratio and a satisfactory optical performance over the entire zooming range.

In accordance with the present invention, there is provided a rear focus-type zoom lens having an index-distribution-type lens, wherein the zoom lens comprises: a first lens group having a positive refracting power; a second lens group having a negative refracting power; a third lens group having a positive refracting power; and a fourth lens group having a positive refracting power. Further, the first through fourth lens groups are arranged in this order from the object side, and the second lens group is moved so as to effect zooming; the fourth lens group is moved so as to compensate for an image plane fluctuation that accompanies the zooming and so as to perform focusing, and at least one of those four lens groups is equipped with an index-distribution-type lens.

It is a particular feature of the present invention that the index-distribution-type lens employed comprises a gradual variation in refractive index toward the periphery of the lens.

DESCRIPTION OF THE PREFERRED EMBODIMENTS

Embodiments of the present invention will now be described with reference to the incident to drawings, in which symbol L1 indicates a first lens group having a positive refracting power; symbol L2 indicates a second lens group having a negative refracting power; symbol L3 indicates a third lens group having a positive refracting power; symbol L4 indicates a fourth lens group having a positive refracting power; symbol SP indicates an aperture stop positioned in front of the third lens group; symbol G indicates a glass member such as a face plate; and symbol FP indicates an image plane.

When zooming from wide-angle to telephoto, the second lens group L2 is moved in the direction indicated by the arrow. At the same time, the fourth lens group is moved to compensate for the image plane fluctuation which is incident to the zooming.

The present invention adopts a rear focus system in which the fourth lens group is moved along the optical axis to effect focusing. In the drawings, the solid-line curve 4a and the broken-line curve 4b respectively represent the locus of movement of the fourth lens group L4 when focusing is being effected with respect to an object at infinity or one in close proximity. The movement illustrated is made in order to compensate for an image plane fluctuation which is incident to zooming from wide-angle to the telephoto end during focusing. The first and third lens groups remain stationary during zooming and focusing.

In the embodiments of the present invention, the fourth lens group L4 is moved to compensate for the image plane fluctuation which is incident to zooming and, at the same time, is moved to effect focusing. In particular, as indicated by curves 4a and 4b in the drawings, the fourth lens group is moved in such a manner that the locus of movement is convex on the object side when the zooming is effected from wide-angle to telephoto. Due to this arrangement, the space between the third and fourth lens groups can be utilized effectively, and the length of the entire zoom lens is reduced.

When focusing is effected with the embodiments of the present invention, for example at the telephoto end, to change focus from an object at infinity to one in close proximity, the fourth lens group is moved forward, as indicated by curve 4c in the drawings.

Figure 1:
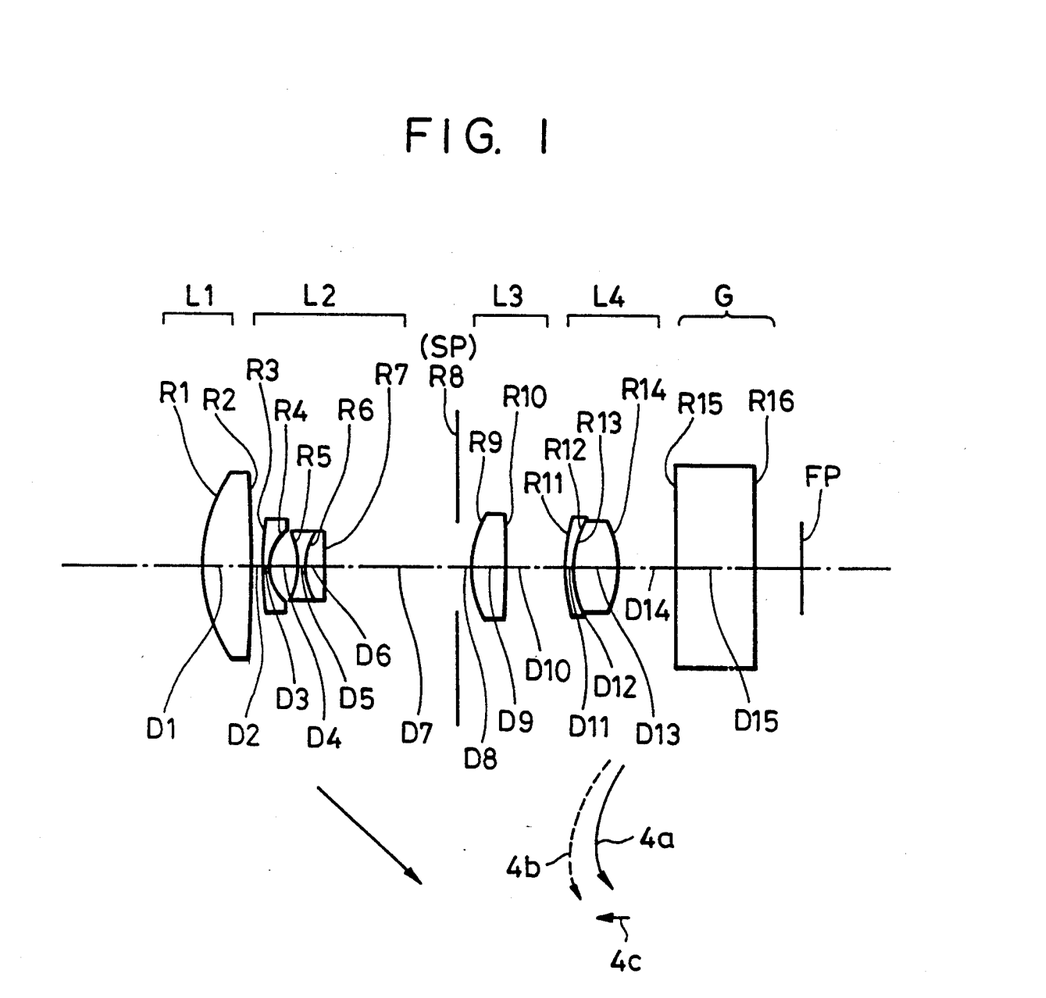
FIG. 1 is a sectional view of a zoom lens according to a first embodiment of the present invention.

In the first numerical embodiment, also shown in FIG. 1, the first lens group L1 (which conventionally would have been composed of two lens groups using three lenses) consists of a single radial lens of the index distribution type that is made of a material with a refractive index which varies perpendicularly to the optical axis, thereby reducing the number of lenses used and the length of the entire zoom lens.

In particular, with an index-distribution-type lens for the first lens group, a desirable index distribution is one where the refractive index gradually decreases toward the periphery and, at the same time, the difference in index between d- and g-lines increases toward the periphery.

To maintain a satisfactory optical performance with a reduced number of lenses, it is desirable that the index-distribution-type lens be formed in such a way as to satisfy the following conditional expressions:

$$0.53 < fT/(N_{od}^2 \cdot f1) < 0.65 \qquad (1)$$

$$1.2 < \frac{N_{1g} - N_{1d}}{N_{og} - N_{od}} < 1.5 \qquad (2)$$

where $N_{od}$ and $N_{og}$ represent the d-line and g-line refractive indexes on the optical axis, respectively; $N_{1d}$ and $N_{1g}$ represent the d-line and g-line refractive indexes at positions corresponding to 75% of the effective lens diameter, respectively; and f1 and fT represent the focal length at the telephoto end of the first lens group and that of the zoom lens system, respectively.

Conditional expression (1) defines the range of the refracting power of the first lens group. Refracting power below the lower limit of the conditional expression is not desirable since it will result in an increase in the Petzval sum for the lens system as a whole. On the other hand, a refracting power above the upper limit will make it difficult to compensate for spherical aberration or the like generated with the lens at the telephoto end.

Conditional expression (2) is used in setting an appropriate index distribution for the index-distribution-type lens. A value below the lower limit of the conditional expression will make it difficult to effect sufficient compensation for axial chromatic aberration when using the lens at the telephoto end. A value above the upper limit, on the other hand, will result in excessive compensation for axial chromatic aberration.

Figure 2:
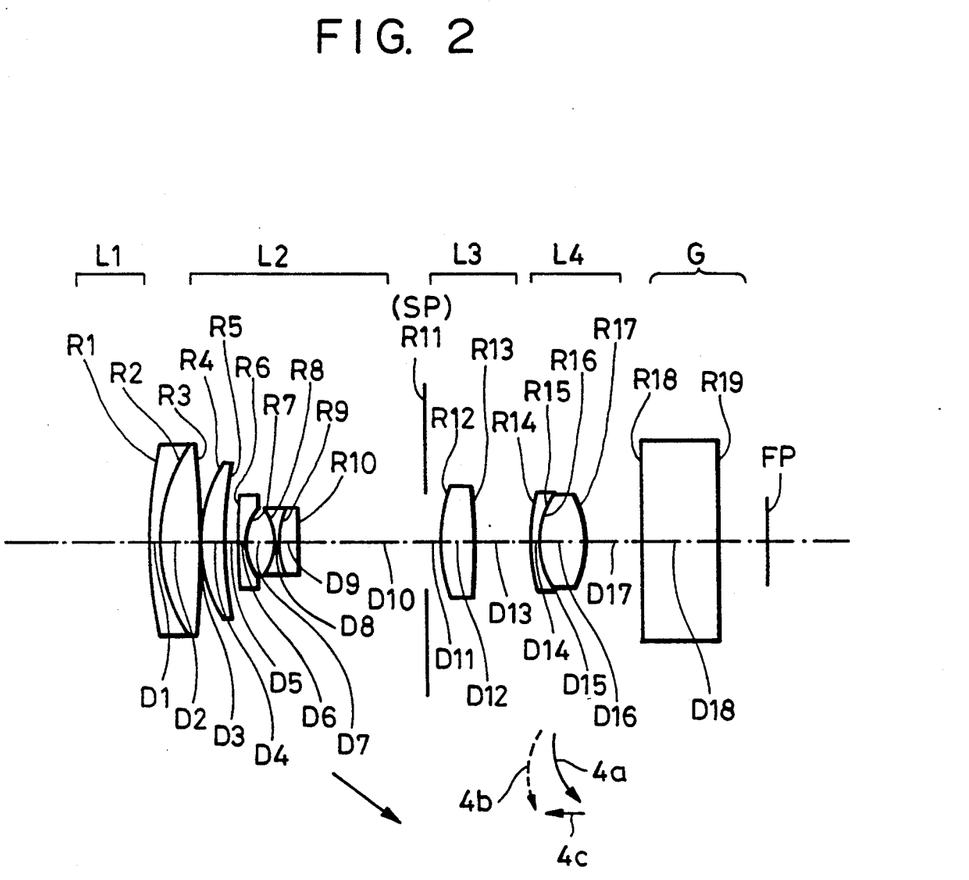
FIG. 2 is a sectional view of a zoom lens according to a second embodiment of the present invention.

In the second numerical embodiment, also shown in FIG. 2, an index distribution-type radial lens is employed as the negative lens in a sandwich structure, thereby preventing an increase in the Petzval sum while maintaining the refracting power of the second lens group at a fixed level. The Petzval sum, P, generated in the index-distribution-type lens can be expressed by the following equation:

$$P = \phi / N_O^2$$

where $\phi$ represents the refracting power due to the convergence or divergence effect in the lens (when the focal length of the entire system is standardized at 1); and $N_O$ represents the refractive index serving as the base. Thus, the Petzval sum is in inverse proportion to the square of the refractive index $N_O$. Accordingly, it is smaller than the Petzval sum $P=\phi/N$ of an ordinary lens.

Due to this arrangement, the amount of movement of the second lens group L2 when zooming is reduced, and the distance between the principal point thereof and that of the first lens group is shortened, thereby making it possible to reduce the length of the entire zoom lens while maintaining satisfactory optical performance over the entire zooming range. Further, the height of an entering ray of an off-axial ray passing through the first lens group is reduced along with the effective diameter of the first lens group, thus attaining a reduction in size and weight of the entire lens system.

Figure 3:
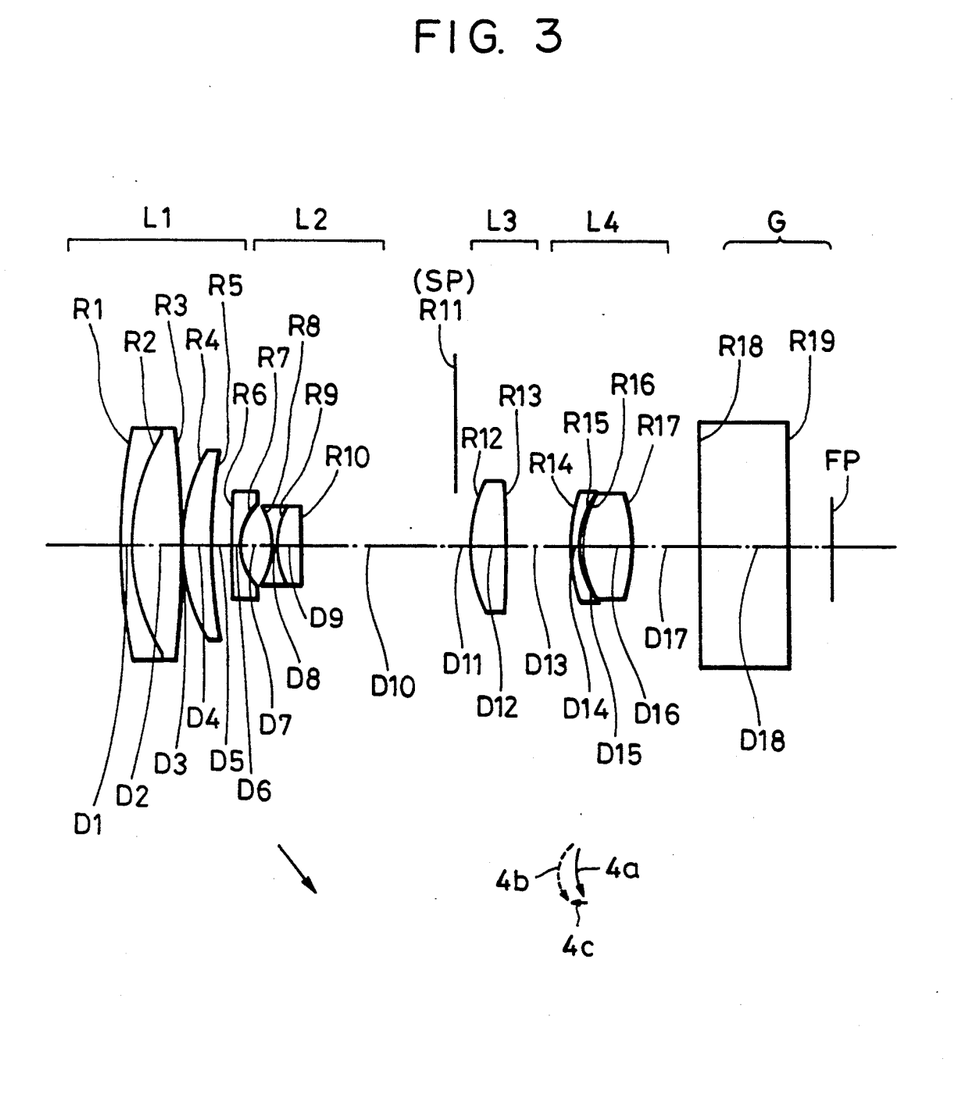
FIG. 3 is a sectional view of a zoom lens according to a third embodiment of the present invention.

In the third numerical embodiment, also shown in FIG. 3, the third lens group L3 comprises a single index-distribution-type radial lens, thereby attaining a reduction in the length of the entire zoom lens and satisfactorily compensating for the spherical aberration and coma while maintaining a fixed level of positive refracting power.

In some conventional zoom lenses, an aspherical lens is employed in the third lens group so as to compensate for spherical aberration. However, where, as in the third embodiment, the third lens group is formed with a single index-distribution-type radial lens, it is not only possible to obtain the same effect as that described above but also to reduce the length of the entire zoom lens while ensuring a fixed positive refracting power and satisfactorily compensating for spherical aberration and coma.

In particular, by providing the third lens group with a convex curvature on the object side, spherical aberration, coma, and the Petzval sum are compensated in a well-balanced manner.

To obtain satisfactory optical performance with this third embodiment, it is desirable that the following conditional expressions be satisfied:

$$0.65 < \gamma_{3,l}/f3 < 0.98 \quad (3)$$

$$0.002 < \Delta N_{7d}/f3 < 0.006 \quad (4)$$

where $\gamma_{3,1}$ represents the radius of curvature of the first lens surface of the third lens group; f3 represents the focal length of the third lens group; and $\Delta N_{7d}$ represents the difference in d-line refractive index between the section of the index-distribution-type lens of the third lens group where the refractive index is maximum and the section thereof where the refractive index is minimum.

Conditional expression (3), which is related to the radius of curvature of the first lens surface of the third lens group, is also related to conditional expression (4). By imparting a curvature to the index-distribution-type radial lens, spherical aberration is satisfactorily compensated.

Conditional expression (4) is related to the difference in refractive index of the index-distribution-type lens of the third lens group, measured vertically with respect to the optical axis. The expression (4) is utilized for restraining the Petzval sum generation. A value above the upper limit of this expression causes a reduction in the Petzval sum, but makes it impossible to maintain a balance with respect to the spherical aberration generated on the first lens surface. A value below the lower limit, on the other hand, will cause the generation of a positive Petzval sum, which also is not desirable.

Figure 4:
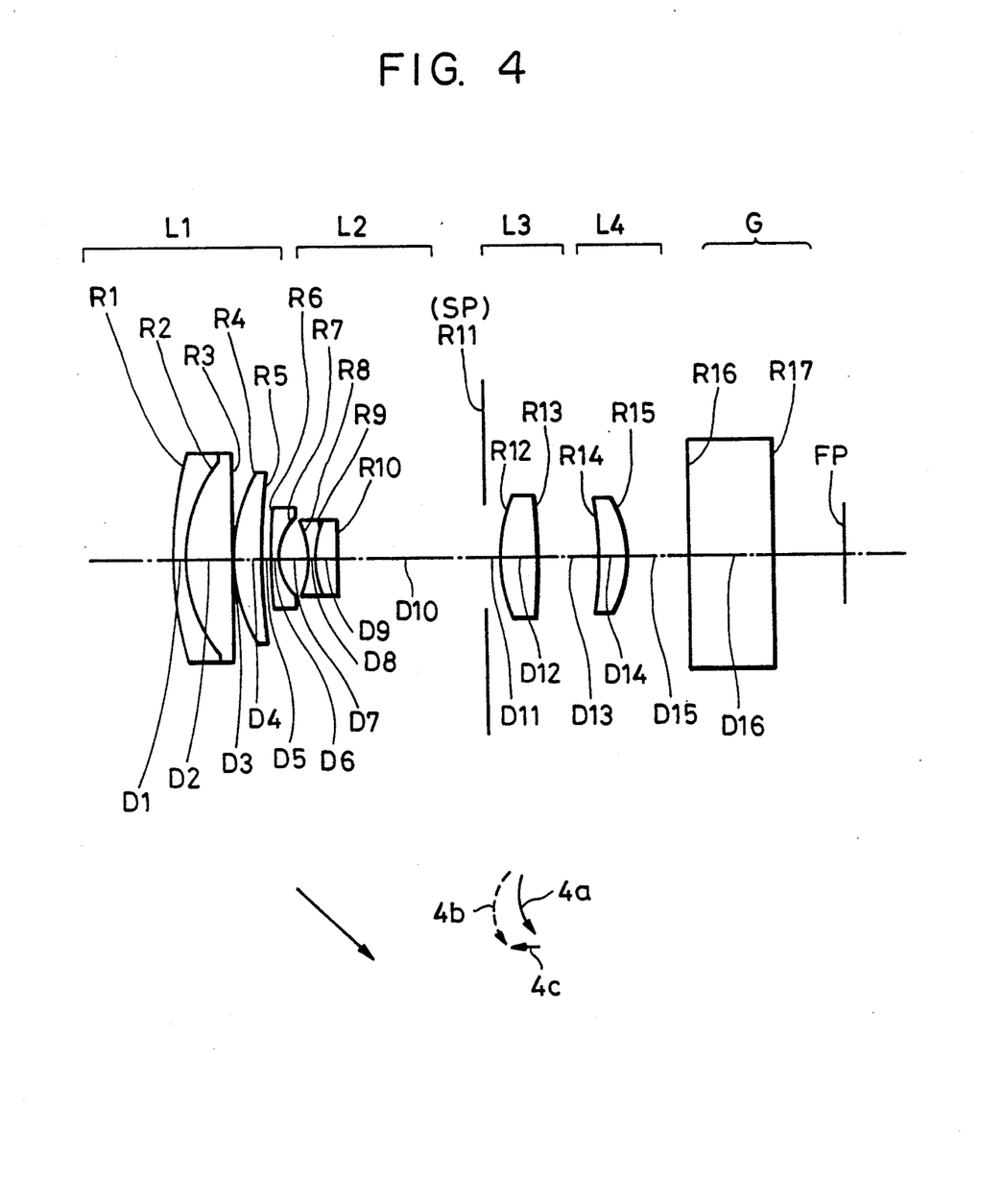
FIG. 4 is a sectional view of a zoom lens according to a fourth embodiment of the present invention.
Figure 5:
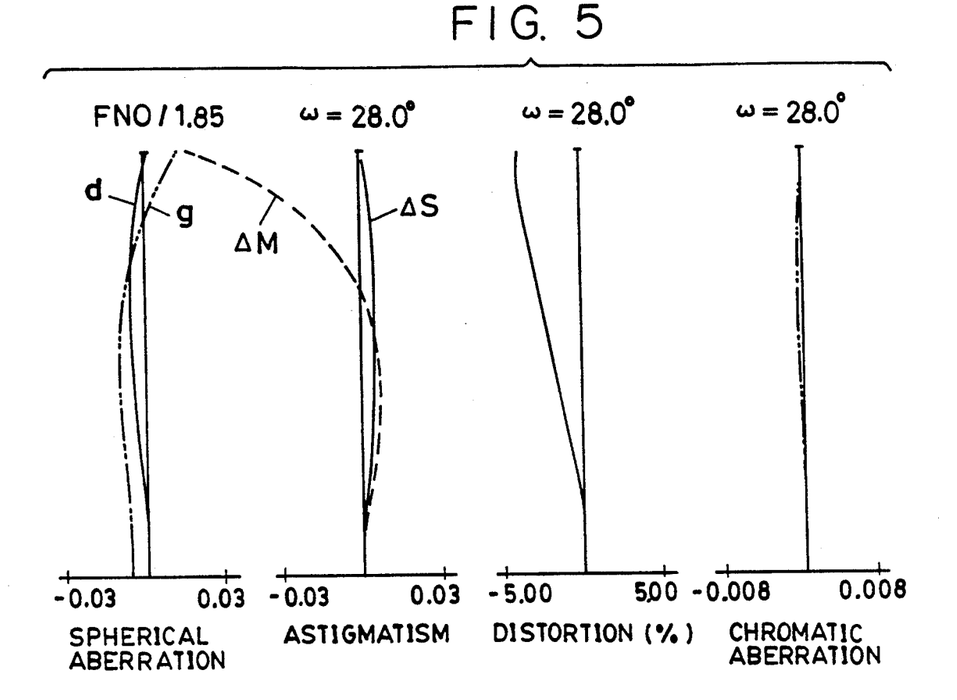
FIG. 5 is a wide-angle-end aberration diagram of the first embodiment.
Figure 6:
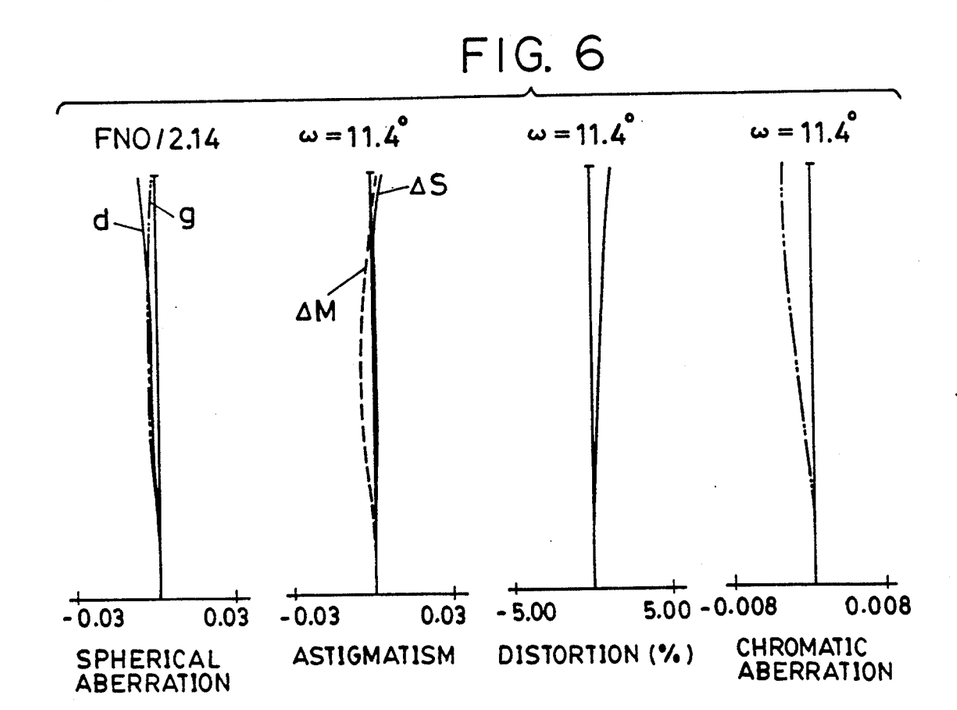
FIG. 6 is a middle-section aberration diagram of the first embodiment.
Figure 7:
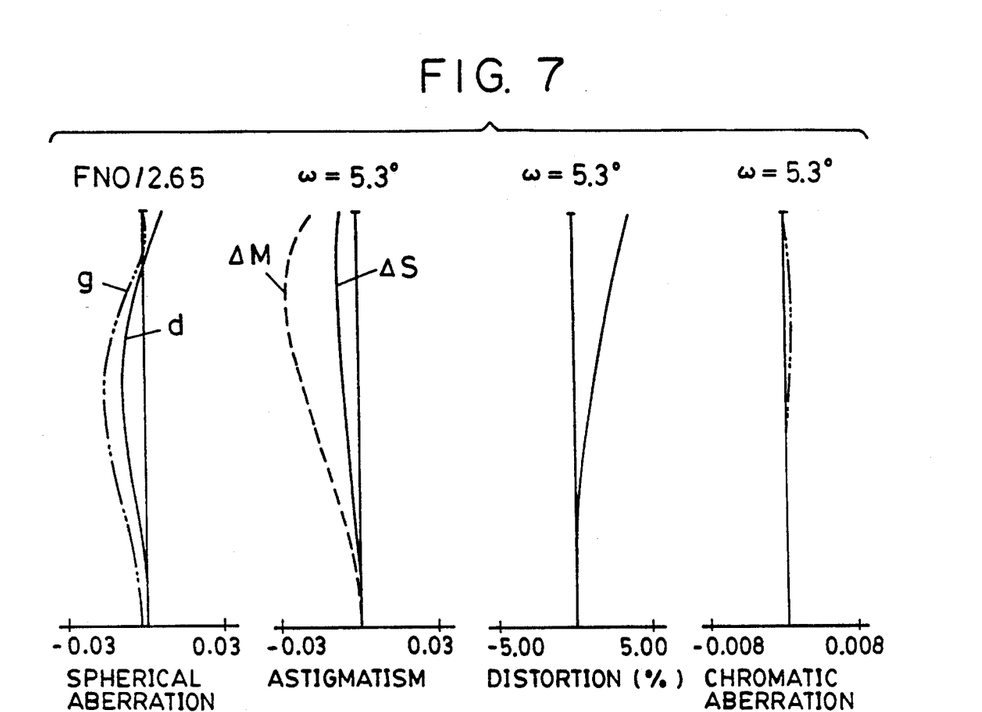
FIG. 7 is a telephoto-end aberration diagram of the first embodiment.
Figure 8:
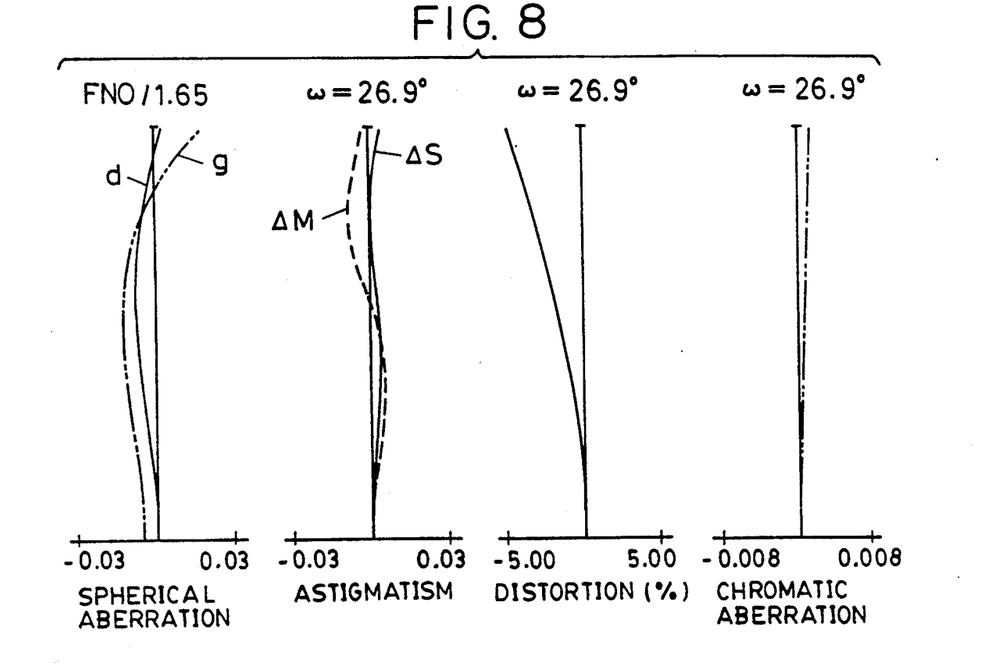
FIG. 8 is a wide-angle-end aberration diagram of the second embodiment.
Figure 9:
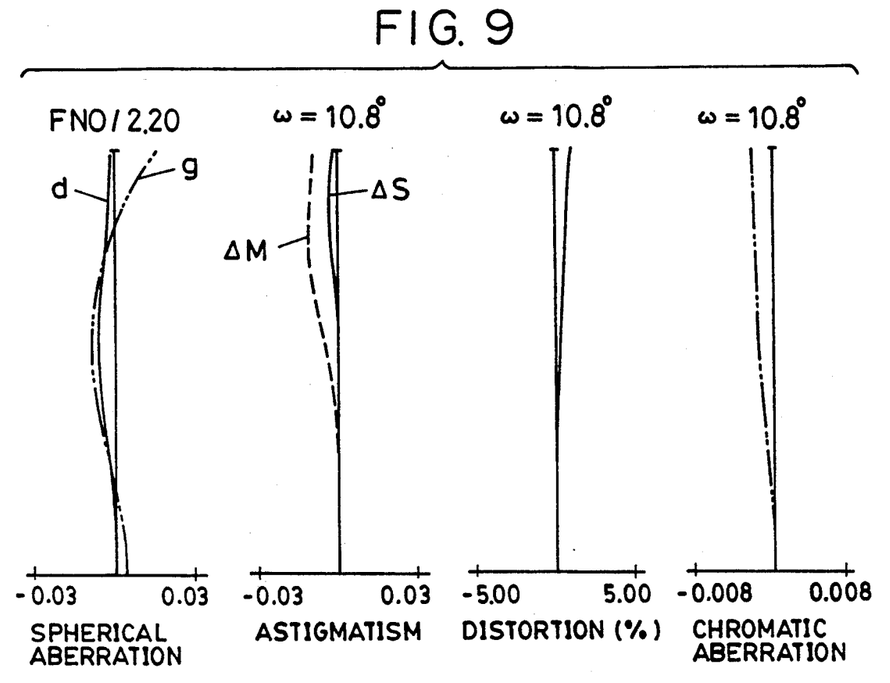
FIG. 9 is a middle-section aberration diagram of the second embodiment.
Figure 10:
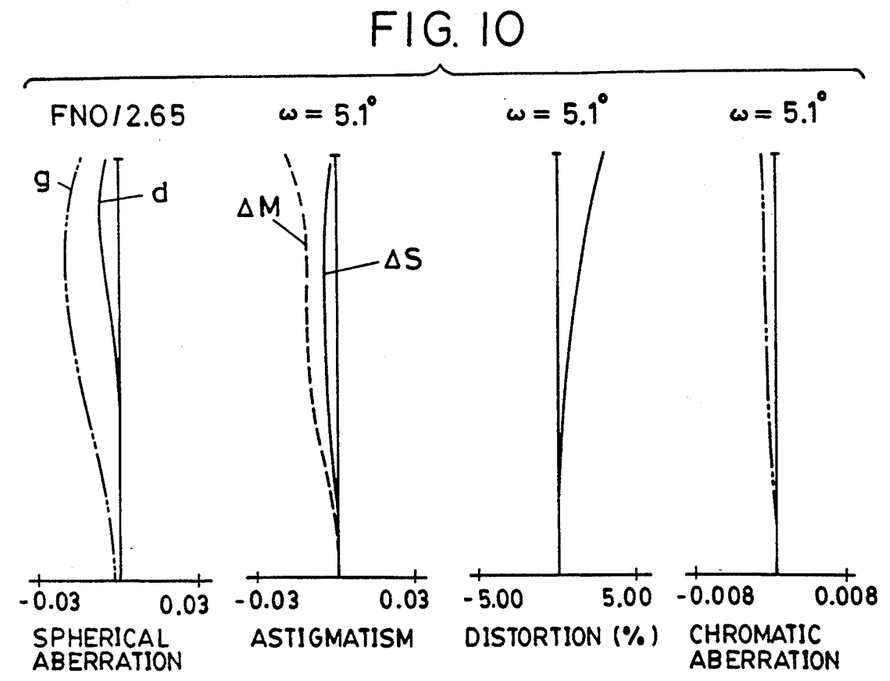
FIG. 10 is a telephoto-end aberration diagram of the second embodiment.
Figure 11:
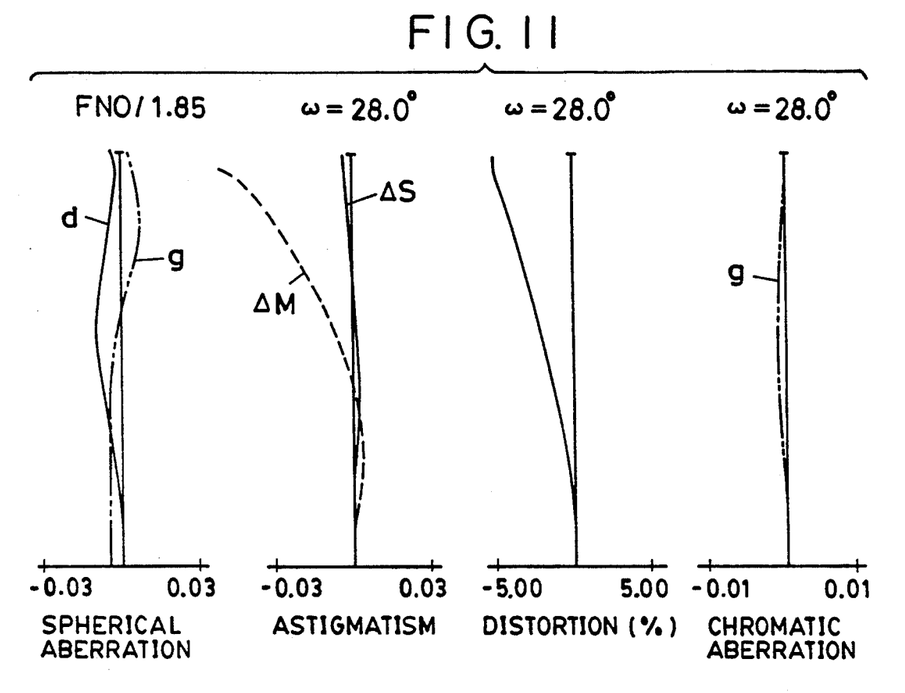
FIG. 11 is a wide-angle-end aberration diagram of the third embodiment.
Figure 12:
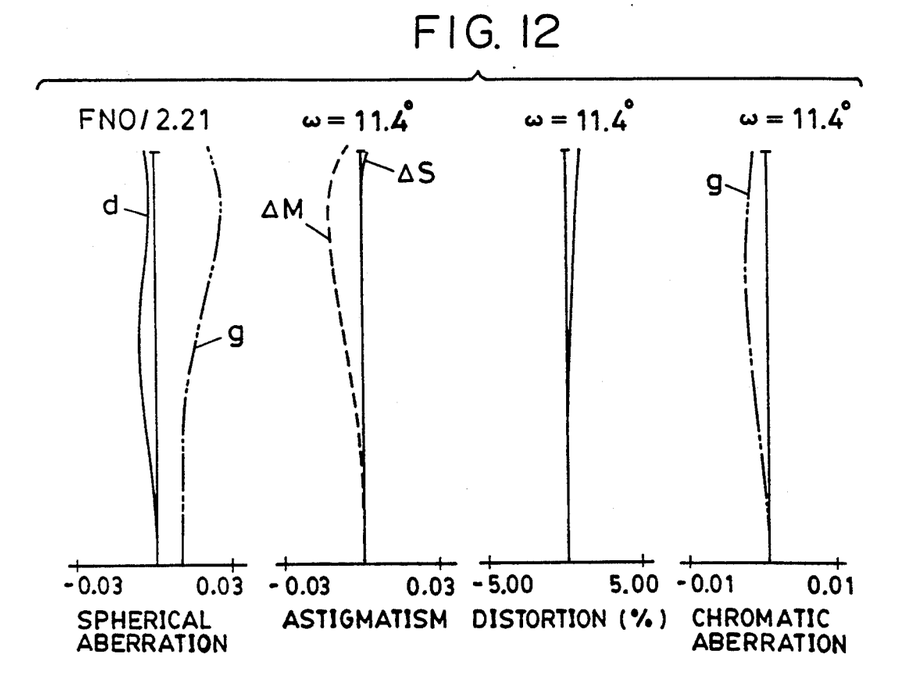
FIG. 12 is a middle-section aberration diagram of the third embodiment.
Figure 13:
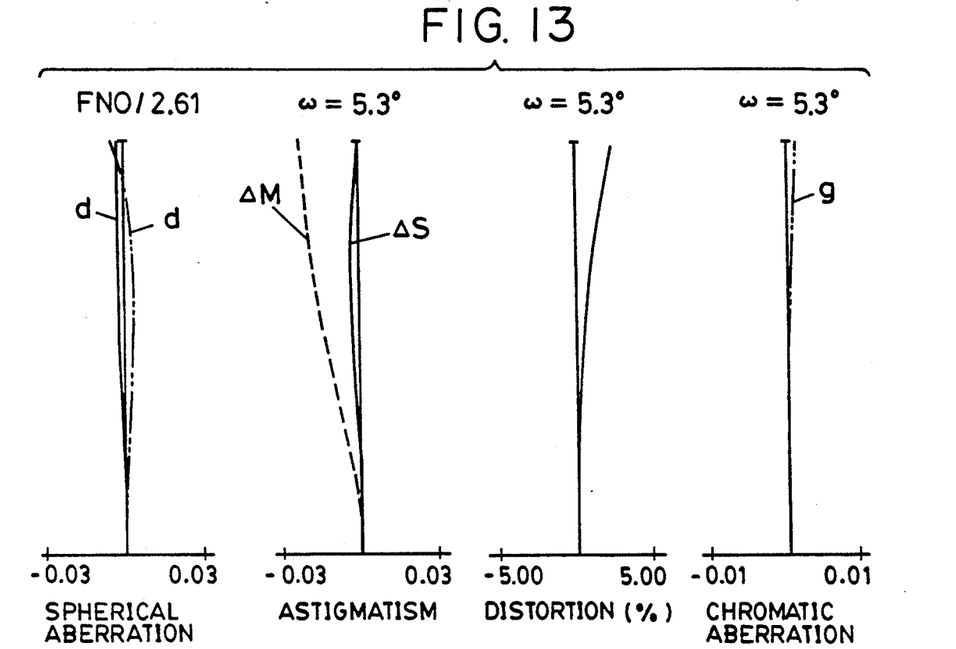
FIG. 13 is a telephoto-end aberration diagram of the third embodiment.
Figure 14:
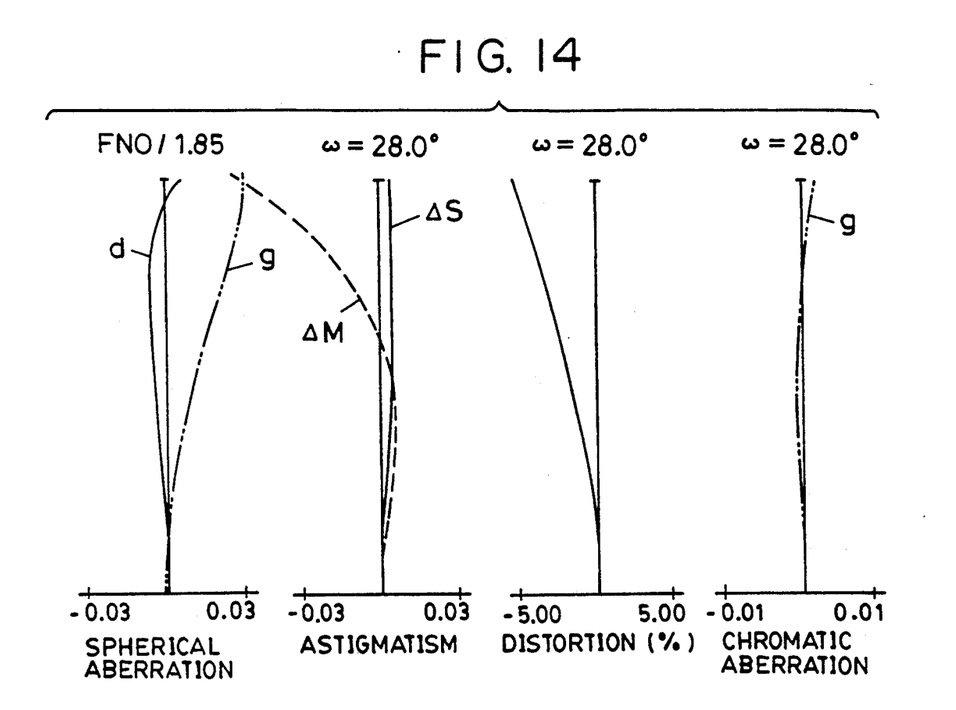
FIG. 14 is a wide-angle-end aberration diagram of the fourth embodiment.
Figure 15:
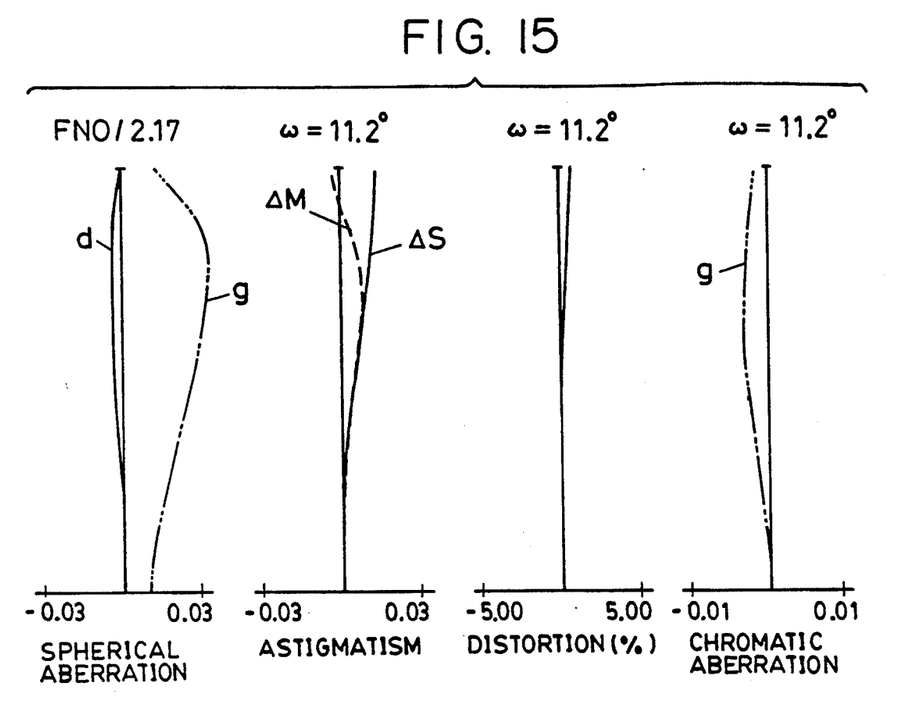
FIG. 15 is a middle-section aberration diagram of the fourth embodiment.
Figure 16:
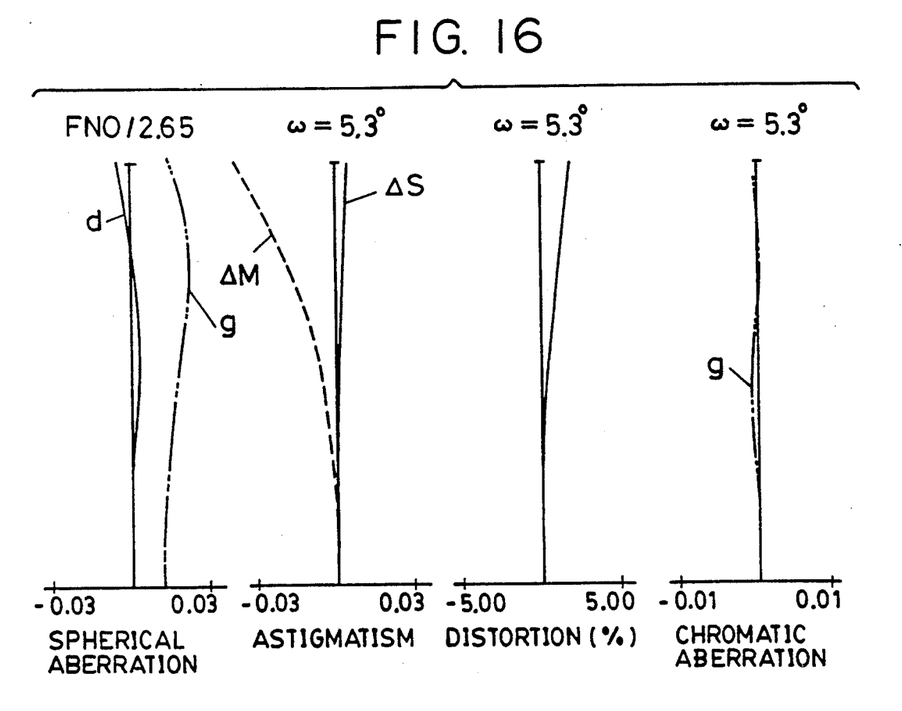
FIG. 16 is a telephoto-end aberration diagram of the fourth embodiment.

In the fourth numerical embodiment of the present invention, also shown in FIG. 4, a fourth lens group having a positive refracting power (which conventionally would have been composed of two or three lenses) consists of a single index-distribution-type radial lens, thereby reducing the length of the entire zoom lens while satisfactorily compensating for variations in aberration incident to zooming.

Since the fourth lens group is moved in order to compensate for the image plane fluctuation which is incident to zooming and, at the same time, in order to perform focusing, it is necessary to provide some air space between this lens group and the third lens group. In view of this, the reduction in the number of lenses in the fourth lens group of this fourth embodiment leads to a reduction in thickness, thus effectively reducing the length of the entire zoom lens. Further, since it also leads to a reduction in the weight of the fourth lens group, this arrangement is advantageous for the zoom lens system as a whole. For example, the torque of an actuator motor or the like for moving the fourth lens group can be reduced, thereby reducing the power consumption.

Further, to maintain satisfactory optical performance even with a reduced number of lenses in this fourth embodiment, it is desirable that the following conditional expressions be satisfied:

$$0.04 < fw/(N_{od}^2 \cdot f4) < 0.31 \quad (5)$$

$$1.1 < \frac{N_{1g} - N_{1d}}{N_{og} - N_{od}} < 1.7 \quad (6)$$

where f4 represents the focal length of the fourth lens group; and fw represents the focal length at the wide-angle end of the zoom lens system.

Conditional expression (5) is related to the refracting power and the lens refractive index of the fourth lens group. A value below the lower limit of this expression implies an increased focal length of the fourth lens group. That is, the amount of movement of the fourth lens group is increased, thereby making it difficult to reduce the size of the zoom lens system. On the other hand, a value above the upper limit of this expression implies a reduction in the focal length of the fourth lens group, which will lead to an increase in the Petzval sum, resulting in an unsatisfactory image plane.

Conditional expression (6) is related to the refractive index distribution of the index-distribution-type lens, and is utilized in compensating, in a well-balanced manner, the axial chromatic aberration generated in the fourth lens group. Further, by forming the fourth lens group in a positive meniscus configuration with a convex surface facing the image plane, it is possible to compensate for astigmatism to a satisfactory degree in relation to the refractive index distribution of the lens.

In accordance with this embodiment, an index-distribution-type lens as described above is adopted along with the rear-focus system, so that an increase in the effective lens diameter of the first lens group can be avoided more effectively, than in a conventional four-lens-unit zoom lens, in which focusing has been performed by moving the first lens group along the optical axis.

Further, by arranging the aperture stop directly before the third lens group, the variation in aberration due to the movable lens group is reduced, and the interval between the lens groups ahead of the aperture stop is shortened, thereby easily attaining a reduction in the front-lens diameter.

Due to the above described construction of the components in this embodiment, it is possible to obtain a high-zoom-ratio zoom lens which provides satisfactory optical performance over the entire zooming range and, further, the entire range of focus distances to an object.

To further compensate variations in aberration over the entire zooming range and obtain satisfactory optical performance with the present invention, it is desirable that the following conditional expressions be satisfied:

$$0.7 < |f2/fw| < 0.9 \quad (7)$$

$$0.58 < f3/f4 < 1 \quad (8)$$

where i varies between 1 and 4 and fi represents the focal length fi of the i-th lens group; and fw represents the focal length at the wide-angle end of the zoom lens system.

Conditional expression (7) is related to the refracting power of the second lens group, and is utilized in effectively obtaining a fixed zoom ratio while reducing those variations in aberration which are incident to the zooming step. When the absolute value of f2/fw is below the lower limit, that is when the refracting power of the second lens group is excessive, the Petzval sum increases negatively to increase the curvature of field and the variations in aberration incident to zooming, though the size of the zoom lens system can then be reduced easily.

On the other hand, a value of f2/fw above the upper limit of this expression, which implies an excessively weak refracting power of the second lens group, is not desirable either, because the amount of movement of the second lens group for obtaining a fixed zoom ratio increases, resulting in an increase in the length of the entire zoom lens system.

Conditional expression (8) is related to the ratio of the refracting power of the third lens group to that of the fourth lens group, and is used in obtaining a desired optical performance while reducing the distance between the third lens group and the image plane. When the refracting power of the third lens group is so strong as to be beyond the lower limit of conditional expression (8), it is difficult to compensate for spherical aberration and coma over a range from wide-angle to the middle zooming position, and a predetermined back focus cannot be obtained.

If, on the other hand, the refracting power of the third lens group is so weak as to be beyond the upper limit of conditional expression (8), the length of the entire zoom lens system cannot be reduced sufficiently.

Next, numerical embodiments of the present invention will be described. In the numerical embodiments, Ri represents the radius of curvature of the i-th lens surface as counted from the object side; Di represents the thickness and the air space of the i-th lens; and Ni represents the refractive index and the Abbe number of the i-th lens.

Assuming that the light travelling direction is positive, an aspherical surface configuration can be expressed by the following equation:

$$X = \frac{(1/R)H^2}{1 + \sqrt{1 - (H/R)^2}} +$$

-continued
$$AH^2 + BH^4 + CH^6 + DH^8 + EH^{10}$$

where X represents an axis in the optical axis direction; H represents an axis in a direction perpendicular to the optical axis; R represents a paraxial radius of curvature; and A, B, C, D and E represent aspherical coefficients.

The refractive index distribution of an index-distribution-type lens, which varies with the height h as measured vertically from the optical axis, can be expressed by the following equation:

$$N(h) = N_0 + N_1 h^2 + N_2 h^4 + N_3 h^6 + N_4 h^8 + \ldots$$

where h represents the height as measured vertically from the optical axis; and N (h) represents the refractive index at the height h.

Numerical Embodiment 1
$F = 1\sim5.70 \quad FNO = 1:1.85\sim2.6 \quad 2\omega = 56.0°\sim10.6°$

| | | |
|---|---|---|
| R1 = 2.608 | D1 = 0.715 | N1 = (h) |
| R2 = −39.624 | D2 = variable | |
| R3 = 6.473 | D3 = 0.083 | N2 = 1.88300 ν2 = 40.8 |
| R4 = 0.765 | D4 = 0.391 | |
| R5 = −1.346 | D5 = 0.083 | N3 = 1.51742 ν3 = 52.4 |
| R6 = 1.126 | D6 = 0.282 | N4 = 1.84666 ν4 = 23.8 |
| R7 = 18.137 | D7 = variable | |
| R8 = stop | D8 = 0.20 | |
| R9 = aspherical | D9 = 0.482 | N5 = 1.58913 ν5 = 61.2 |
| R10 = −9.928 | D10 = variable | |
| R11 = 2.755 | D11 = 0.083 | N6 = 1.84666 ν6 = 23.8 |
| R12 = 1.208 | D12 = 0.032 | |
| R13 = 1.375 | D13 = 0.624 | N7 = 1.58913 ν7 = 61.2 |
| R14 = aspherical | D14 = 0.831 | |
| R15 = ∞ | D15 = 1.081 | N8 = 1.51633 ν8 = 64.1 |
| R16 = ∞ | | |

R15 and R16 are filters such as face plates.

TABLE 1

| Variable space | Focal length | 1.00 | 2.65 | 5.70 |
|---|---|---|---|---|
| | D2 | 0.17 | 1.21 | 1.82 |
| | D7 | 1.89 | 0.84 | 0.23 |
| | D10 | 0.83 | 0.43 | 0.83 |
| R9: aspherical surface | $R_0 = 1.917$ $C = -6.468 \times 10^{-3}$ | | $B = -4.248 \times 10^{-2}$ $D = -5.306 \times 10^{-3}$ | |
| R14: aspherical surface | $R_0 = -2.045$ $C = -6.871 \times 10^{-3}$ | | $B = 1.140 \times ^{-2}$ $D = -5.809 \times 10^{-2}$ | |

TABLE 2

Index Distribution Coefficients

| | λ | $N_0$ | $N_1$ |
|---|---|---|---|
| N1 (h) | d | 1.6500 | $-1.6514 \times 10^{-2}$ |
| | g | 1.6620 | $-1.3584 \times 10^{-2}$ |
| | λ | $N_2$ | $N_3$ |
| N1 (h) | d | $-8.0484 \times 10^{-4}$ | $5.6222 \times 10^{-4}$ |
| | g | $-1.1596 \times 10^{-4}$ | $1.5760 \times 10^{-3}$ |

Numerical Embodiment 2
$F = 1\sim5.69 \quad FNO = 1:1.85\sim2.65 \quad 2\omega = 53.8°\sim10.2°$

| | | |
|---|---|---|
| R1 = 8.104 | D1 = 0.134 | N1 = 1.80518 ν1 = 25.4 |
| R2 = 2.485 | D2 = 0.555 | N2 = 1.60311 ν2 = 60.7 |
| R3 = −15.459 | D3 = 0.031 | |
| R4 = 2.345 | D4 = 0.341 | N3 = 1.80400 ν3 = 46.6 |
| R5 = 8.535 | D5 = variable | |
| R6 = 4.430 | D6 = 0.079 | N4 = 1.88300 ν4 = 40.8 |
| R7 = 0.799 | D7 = 0.381 | |
| R8 = −1.034 | D8 = 0.079 | N5 = (h) |
| R9 = 1.107 | D9 = 0.269 | N6 = 1.84666 ν6 = 23.8 |
| R10 = 10.856 | D10 = variable | |

-continued

Numerical Embodiment 2
F = 1~5.69    FNO = 1:1.85~2.65    2ω = 53.8°~10.2°

| | | |
|---|---|---|
| R11 = stop | D11 = 0.19 | |
| R12 = aspherical | D12 = 0.460 | N7 = 1.58313  ν7 = 59.4 |
| R13 = −8.244 | D13 = variable | |
| R14 = 2.788 | D14 = 0.079 | N8 = 1.84666  ν8 = 23.8 |
| R15 = 1.090 | D15 = 0.034 | |
| R16 = 1.220 | D16 = 0.595 | N9 = 1.58313  ν9 = 59.4 |
| R17 = aspherical | D17 = 0.793 | |
| R18 = ∞ | D18 = 1.031 | N10 = 1.51633  ν10 = 64.1 |
| R19 = ∞ | | |

R18 and R19 represent filters such as face plates.

TABLE 3

| Variable space | Focal length | 1.00 | 2.67 | 5.69 |
|---|---|---|---|---|
| | D5 | 0.14 | 1.12 | 1.69 |
| | D10 | 1.77 | 0.79 | 0.22 |
| | D13 | 0.79 | 0.32 | 0.78 |

| R12: aspherical surface | $R_0 = 1.684$ | $B = -5.581 \times 10^{-2}$ |
| | $C = -3.566 \times 10^{-3}$ | $D = -8.379 \times 10^{-3}$ |
| R17: aspherical surface | $R_0 = -2.003$ | $B = 1.480 \times ^{-3}$ |
| | $C = 2.480 \times 10^{-2}$ | $D = -1.284 \times 10^{-1}$ |

TABLE 4

Index Distribution Coefficients

| | λ | $N_0$ | $N_1$ |
|---|---|---|---|
| N5 (h) | d | 1.5174 | $3.3546 \times 10^{-2}$ |
| | g | 1.5297 | $-5.3617 \times 10^{-3}$ |

| | λ | $N_2$ | $N_3$ |
|---|---|---|---|
| N5 (h) | d | $-8.1654 \times 10^{-2}$ | $3.3958 \times 10^{-1}$ |
| | g | $1.2399 \times 10^{-1}$ | 0 |

Numerical Embodiment 3
F = 1~5.7    FNO = 1:1.85~2.61    2ω = 56.1°~10.7°

| | | |
|---|---|---|
| R1 = 8.413 | D1 = 0.141 | N1 = 1.80518  ν1 = 25.4 |
| R2 = 2.710 | D2 = 0.582 | N2 = 1.60311  ν2 = 60.7 |
| R3 = −15.678 | D3 = 0.033 | |
| R4 = 2.416 | D4 = 0.357 | N3 = 1.80400  ν3 = 46.6 |
| R5 = 8.039 | D5 = variable | |
| R6 = 9.604 | D6 = 0.083 | N4 = 1.88300  ν4 = 40.8 |
| R7 = 0.799 | D7 = 0.379 | |
| R8 = −1.222 | D8 = 0.083 | N5 = 1.51742  ν5 = 52.4 |
| R9 = 1.222 | D9 = 0.282 | N6 = 1.84666  ν6 = 23.8 |
| R10 = −232.481 | D10 = variable | |
| R11 = stop | D11 = 0.199 | |
| R12 = 1.950 | D12 = 0.416 | N7 = (h) |
| R13 = −23.935 | D13 = variable | |
| R14 = 2.806 | D14 = 0.083 | N8 = 1.84666  ν8 = 23.8 |
| R15 = 1.100 | D15 = 0.031 | |
| R16 = 1.255 | D16 = 0.624 | N9 = 1.58313  ν9 = 59.4 |
| R17 = aspherical | D17 = 0.831 | |
| R18 = ∞ | D18 = 1.081 | N10 = 1.51633  ν10 = 64.2 |
| R19 = ∞ | | |

R18 and R19 represent filters such as face plates.

TABLE 5

| Variable space | Focal length | 1.00 | 2.63 | 5.70 |
|---|---|---|---|---|
| | D5 | 0.13 | 1.18 | 1.79 |
| | D10 | 1.89 | 0.84 | 0.23 |
| | D13 | 0.85 | 0.37 | 0.85 |

| R17: aspherical surface | $R_0 = -2.191$ | |
| | $A = 0$ | $B = -5.442 \times 10^{-3}$ |
| | $C = 7.177 \times 10^{-3}$ | $D = -1.112 \times 10^{-1}$ |

TABLE 6

Index Distribution Coefficients

| | λ | $N_0$ | $N_1$ |
|---|---|---|---|
| N7 (h) | d | 1.6229 | $9.5734 \times 10^{-2}$ |
| | g | 1.6363 | $-9.7169 \times 10^{-2}$ |

| | λ | $N_2$ | $N_3$ |
|---|---|---|---|
| N7 (h) | d | $-1.0360 \times 10^{-2}$ | $1.1001 \times 10^{-2}$ |
| | g | 0 | 0 |

Numerical Embodiment 4
F = 1~5.7    FNO = 1:1.85~2.65    2ω = 56.1°~10.7°

| | | |
|---|---|---|
| R1 = 5.755 | D1 = 0.141 | N1 = 1.80518  ν1 = 25.4 |
| R2 = 2.204 | D2 = 0.582 | N2 = 1.60311  ν2 = 60.7 |
| R3 = 73.270 | D3 = 0.033 | |
| R4 = 2.376 | D4 = 0.357 | N3 = 1.80400  ν3 = 46.6 |
| R5 = 9.817 | D5 = variable | |
| R6 = 5.639 | D6 = 0.083 | N4 = 1.88300  ν4 = 10.8 |
| R7 = 0.740 | D7 = 0.394 | |
| R8 = −1.168 | D8 = 0.083 | N5 = 1.51742  ν5 = 52.4 |
| R9 = 1.169 | D9 = 0.282 | N6 = 1.84666  ν6 = 23.8 |
| R10 = −37.983 | D10 = variable | |
| R11 = stop | D11 = 0.199 | |
| R12 = aspherical | D12 = 0.482 | N7 = 1.58313  ν7 = 59.4 |
| R13 = −7.850 | D13 = variable | |
| R14 = −3.626 | D14 = 0.332 | N8 = (h) |
| R15 = −1.723 | D15 = 0.831 | |
| R16 = ∞ | D16 = 1.081 | N9 = 1.51633  ν9 = 64.2 |
| R17 = ∞ | | |

R16 and R17 represent filters such as face plates.

TABLE 7

| Variable space | Focal length | 1.00 | 2.68 | 5.70 |
|---|---|---|---|---|
| | D5 | 0.11 | 1.15 | 1.76 |
| | D10 | 1.89 | 0.84 | 0.23 |
| | D13 | 0.84 | 0.39 | 0.84 |

| R12: aspherical surface | $R_0 = 1.962$ | |
| | $A = 0$ | $B = -5.064 \times 10^{-2}$ |
| | $C = 5.536 \times 10^{-3}$ | $D = -8.944 \times 10^{-3}$ |

TABLE 8

Index Distribution Coefficients

| | λ | $N_0$ | $N_1$ |
|---|---|---|---|
| N8 (h) | d | 1.6500 | $-1.3212 \times 10^{-1}$ |
| | g | 1.680 | $-1.0436 \times 10^{-1}$ |

| | λ | $N_2$ | $N_3$ |
|---|---|---|---|
| N8 (h) | d | $2.5799 \times 10^{-2}$ | $1.9533 \times 10^{-2}$ |
| | g | $6.0297 \times 10^{-2}$ | $2.0245 \times 10^{-2}$ |

TABLE 9

| | Embodiment | | | |
|---|---|---|---|---|
| Conditional expression | 1 | 2 | 3 | 4 |
| (1) $fT/(N_{od}^2 \cdot f1)$ | 0.599 | — | — | — |
| (2) $(N_{1g}-N_{1d})/(N_{og}-N_{od})$ | 1.358 | — | — | — |
| (3) $\gamma 3.1/f3$ | — | — | 0.818 | — |
| (4) $\Delta N_{7d}/f3$ | — | — | 0.004 | — |
| (5) $fw/(N_{od}^2 \cdot f4)$ | — | — | — | 0.11 |
| (6) $(N_{1g}-N_{1d})/(N_{og}-N_{od})$ | — | — | — | 1.38 |
| (7) $|f2/fw|$ | 0.840 | 0.786 | 0.840 | 0.840 |
| (8) $f3/f4$ | 0.904 | 0.748 | 0.651 | 0.816 |

As described above, in accordance with the present invention, a zoom lens of the type having four lens groups with fixed refracting powers employs (instead of or together with an spherical lens surface configuration) an index-distribution-type lens formed of a material wherein the refracting power varies continuously. Further, this zoom lens adopts a rear focus system, thereby realizing a rear-focus-type zoom lens which makes it possible to easily obtain high zoom ratio while reducing the size of the entire lens system and satisfactory optical performance over the entire zooming range.

While the present invention has been described with respect to what presently are considered to be the preferred embodiments, it is understood that the invention is not limited to the disclosed embodiments. To the contrary, the present invention is intended to cover various modifications and equivalent arrangements included with the spirit and scope of the appended claims. The following claims are to be accorded with a broad interpretations, so as to encompass all such modifications and equivalent structures and functions.

What is claimed is:

1. A zoom lens comprising: a first lens group having a positive refracting power; a second lens group having a negative refracting power; a third lens group having a positive refracting power; and a fourth lens group having a positive refracting power, said first through fourth lens groups being arranged in this order from the object side, wherein said second lens group is moved to effect zooming, said fourth lens group is moved so as to compensate for image plane fluctuations which are incident to zooming and also to perform focusing, and at least one of the four lens groups is equipped with an index-distribution-type lens.

2. A zoom lens according to claim 1, wherein said index-distribution-type lens has a refractive index which varies gradually with an increase in distance from an optical axis.

3. A zoom lens according to claim 1, wherein said zoom lens satisfies the following conditional expressions:

$$0.7 < |f2/fw| < 0.9$$

$$0.58 < f3/f4 < 1$$

where i varies between 1 and 4 and fi represents the focal length of the i-th lens group and fw represents the focal length of the entire system at a wide-angle end.

4. A zoom lens according to claim 1, wherein said first lens group has an index-distribution-type lens and satisfies the following conditional expressions:

$$0.53 < fT/(N_{od}^2 \cdot f1) < 0.65$$

$$1.2 < \frac{N_{1g} - N_{1d}}{N_{og} - N_{od}} < 1.5$$

where $N_{od}$ and $N_{og}$ represent d-line and g-line refractive indexes on an optical axis, respectively; $N_{1d}$ and $N_{1g}$ represent d-line and g-line refractive indexes at positions corresponding to 75% of an effective lens diameter, respectively; and f1 and fT represent the focal length at a telephoto end of said first lens group and that of the zoom lens system, respectively.

5. A zoom lens according to claim 1, wherein said third lens group includes an index-distribution-type lens and satisfies the following conditional expressions:

$$0.65 < \gamma_{3,1}/f3 < 0.98$$

$$0.002 < \Delta N_{7d}/f3 < 0.006$$

where $\gamma_{3,1}$ represents the radius of curvature of the first lens surface of said third lens group; f3 represents the focal length of said third lens group; and $\Delta N_{7d}$ represents the difference in d-line refractive index between the section of the index-distribution-type lens of said third lens group where the refractive index is maximum and the section thereof where the refractive index is minimum.

6. A zoom lens according to claim 1, wherein said fourth lens group includes an index-distribution-type lens and satisfies the following conditional expressions:

$$0.04 < fw/(N_{od}^2 \cdot f4) < 0.31$$

$$1.1 < \frac{N_{1g} - N_{1d}}{N_{og} - N_{od}} < 1.7$$

where f4 represents the focal length of said fourth lens group; fw represents the focal length at the wide-angle end of the zoom lens system; $N_{od}$ and $N_{og}$ represent d-line and g-line refractive indexes on an optical axis, respectively; and $N_{1d}$ and $N_{1g}$ represent the d-line and g-line refractive indexes at positions corresponding to 75% of the effective lens diameter, respectively.

7. A zoom lens comprising:
a first lens group having a positive refracting power;
a second lens group having a negative refracting power;
a third lens group having a positive refracting power;
a fourth lens group having a positive refracting power; and
a stop located between said second lens group and said third lens group, and
wherein said first through fourth lens groups are arranged along the optical axis in this order from the object side, and
wherein said second lens group is moved to effect zooming, said fourth lens group is moved so as the compensate for image plane fluctuations, which are incident to zooming, and to perform focusing, and
wherein at least one of the four lens groups is equipped with an index-distribution-type lens.

* * * * *

UNITED STATES PATENT AND TRADEMARK OFFICE
CERTIFICATE OF CORRECTION

PATENT NO. : 5,321,552
DATED : June 14, 1994
INVENTOR(S) : Akihisa HORIUICHI, ET AL.

It is certified that error appears in the above-indentified patent and that said Letters Patent is hereby corrected as shown below:

ON THE COVER
   Under the heading "Foreign Patent Documents", "239011 2/1990 Japan" should read --2-39011 2/1990 Japan--.

COLUMN 1
   Line 50, "choose of" should read --choose an appropriate zoom type and increase the refracting powers of--.

COLUMN 4
   Line 66, "$N_O$" should read --$N_0$--;
   Line 68, "index $N_O$." should read --index $N_0$.--.

COLUMN 8
   Table 1, "B=1.140 x $^{-2}$" should read --B=1.140 x $10^{-2}$--.

COLUMN 9
   Table 3, "B=1.480 x $^{-3}$" should read --B=1.480 x $10^{-3}$--.

COLUMN 10
   Numerical Embodiment 4, "$\nu 2=60$" should read --$\nu 2=60.7$--;
   Numerical Embodiment 4, ".7" should be deleted;
   Numerical Embodiment 4, "$\nu 4=10.8$" should read --$\nu 4=40.8$--;
   Table 9, "(6) $(N_{lg}-N_{ld})/(N_{og}-No_{od})$" should read --(6) $(N_{lg}-N_{ld})/N_{og}-N_{od})$--; and
   Line 67, "an" should read --a--.

COLUMN 11
   Line 15, "interpretations," should read --interpretation,--.

UNITED STATES PATENT AND TRADEMARK OFFICE
CERTIFICATE OF CORRECTION

PATENT NO. : 5,321,552

DATED : June 14, 1994

INVENTOR(S) : Akihisa Horiuichi, et al.

It is certified that error appears in the above-indentified patent and that said Letters Patent is hereby corrected as shown below:

Column 12, line 53, "the" should read --to--.

Signed and Sealed this

Twenty-second Day of November, 1994

Attest:

BRUCE LEHMAN

Attesting Officer

Commissioner of Patents and Trademarks